Sept. 28, 1926.
J. H. HOLMGREEN
1,601,446
ATTACHMENT FOR TRACTORS
Filed May 3, 1924      3 Sheets-Sheet 2
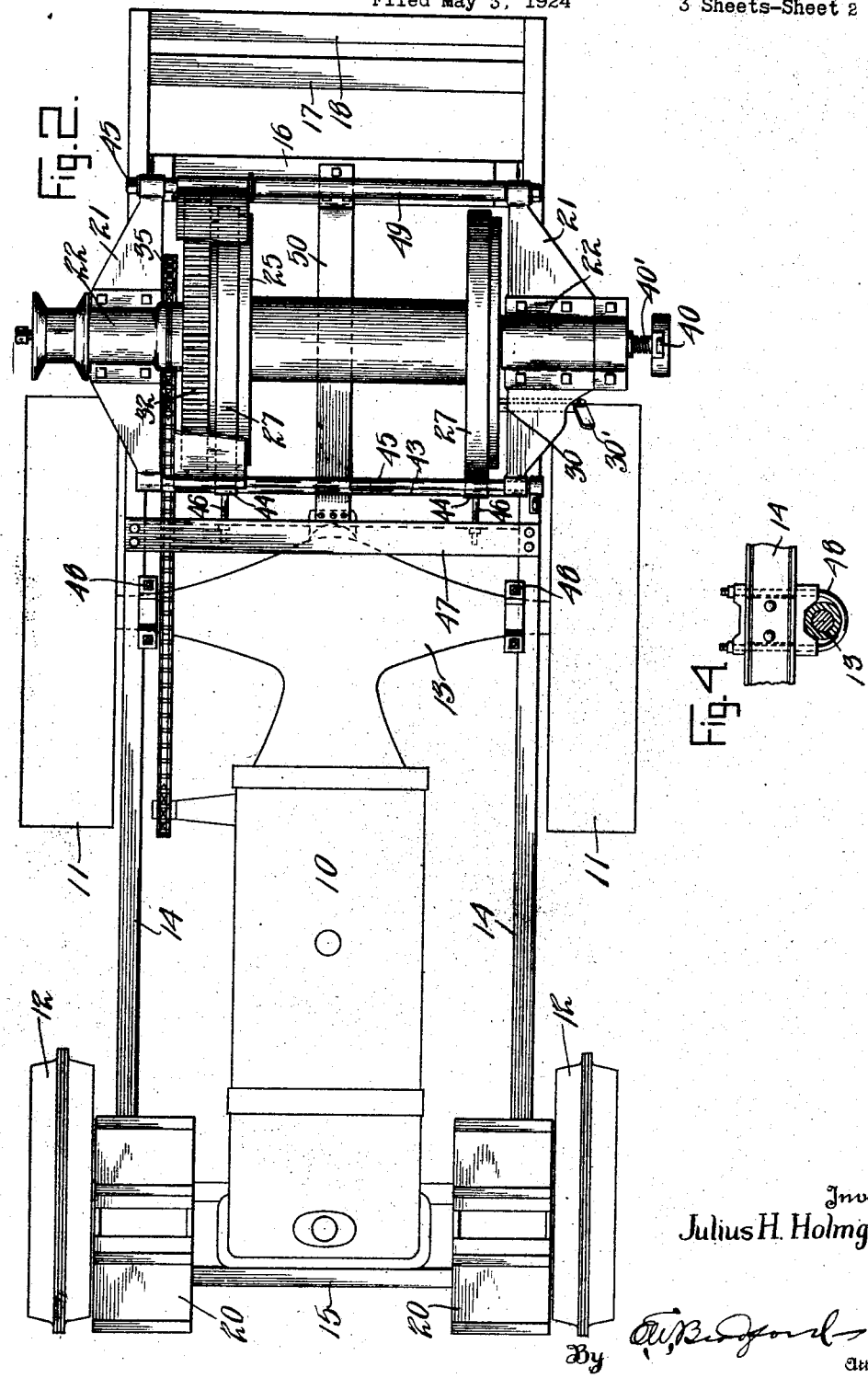
Inventor
Julius H. Holmgreen
By
Attorney Sept. 28, 1926.
J. H. HOLMGREEN
ATTACHMENT FOR TRACTORS
Filed May 3, 1924
1,601,446
3 Sheets-Sheet 3
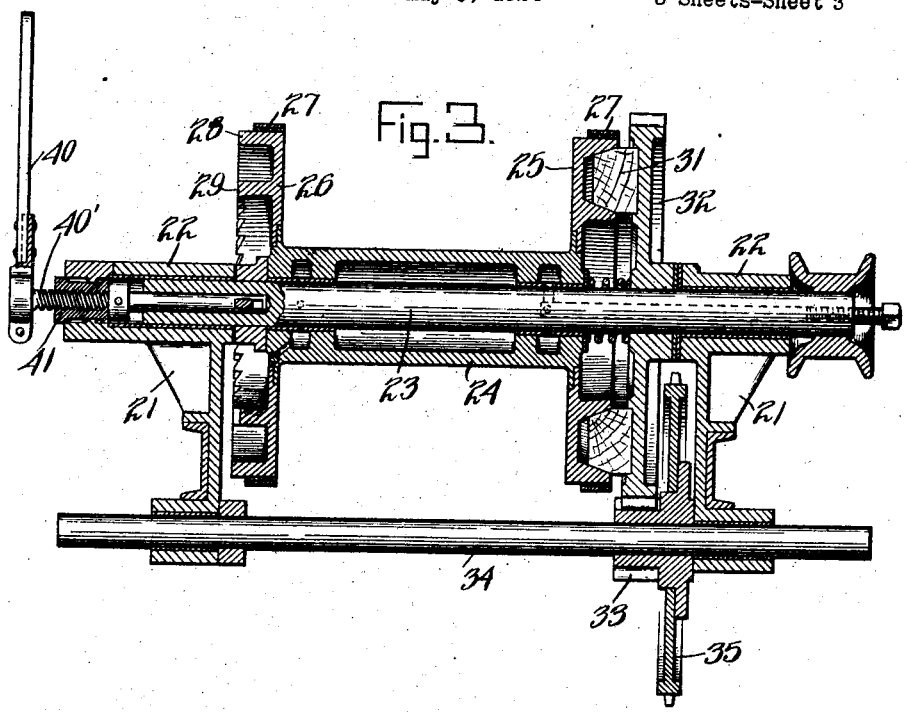
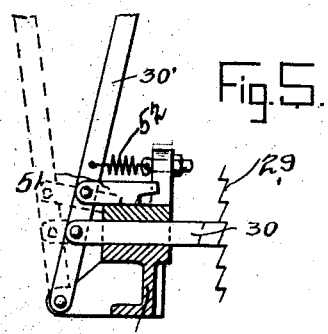
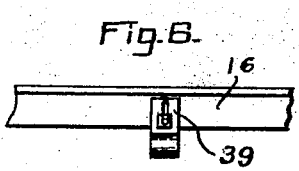
Inventor
Julius H. Holmgreen
By
Attorney Patented Sept. 28, 1926.

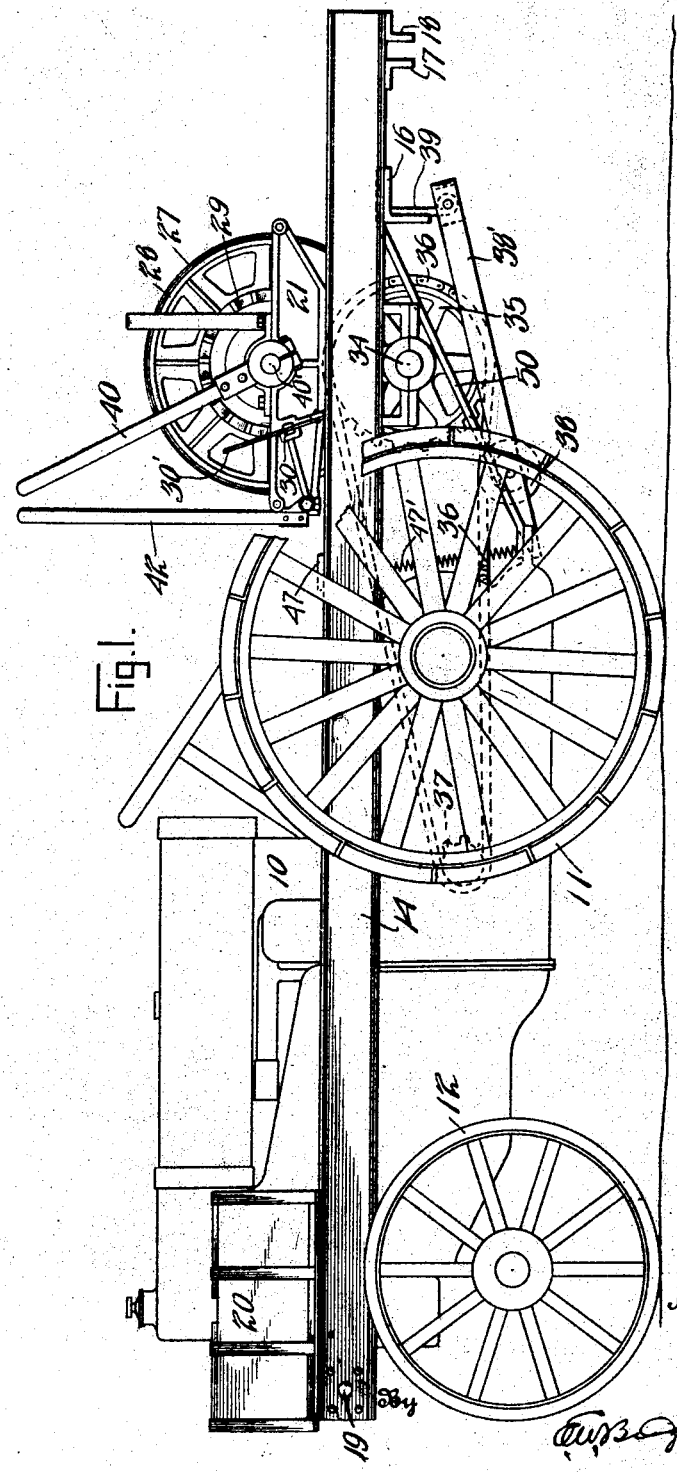

1,601,446

UNITED STATES PATENT OFFICE.

JULIUS H. HOLMGREEN, OF SAN ANTONIO, TEXAS.

ATTACHMENT FOR TRACTORS.

Application filed May 3, 1924. Serial No. 710,944.

My said invention relates to a hoist or winch for attachment to a tractor to be used in oil fields and for other situations where hard service is required. One object of the invention is to provide a strong and practical means for mounting a device of this character on a tractor which is shown in the drawings as being of the Fordson type though not necessarily limited to use with a tractor of this character.

It has heretofore been suggested that a machine of this kind be attached to the rear casing or differential housing of a Fordson tractor, this being done by bolting it to the casing with the bolts that assemble the rear axle housing. These bolts, however, are not intended to withstand a strain equal to the pull of a winch and therefore the bolts soon become loose and in time strip their threads thus practically incapacitating the rear end of the motor truck. It has also been suggested that the winch be attached to the front end of the tractor. The front end of a tractor, however, is not intended to carry such a load nor yet to bear the strain of the pull of the winch and this again results in difficulties.

It is also an object of my invention to provide such a means for attaching the frame to the tractor as will afford a strong and permanent yet readily removable support for the winch whereby the same may be used indefinitely without material depreciation.

Another object of the invention is to provide means for decreasing the liability of the tractor to overturn under excessive loads. This is impossible where the frame of my invention is used for supporting the winch. It is to be understood that the frame may support other portable mechanisms and that I do not limit myself to the use of a winch with the frame.

Referring to the accompanying drawings, which are made a part hereof and on which similar reference characters indicate similar parts, Figure 1 is a side elevation of a tractor with my attachments applied thereto,

Figure 2, a plan,

Figure 3, a central section through the winch,

Figure 4, a detail of parts shown in Figure 2,

Figure 5 a fragmentary section at right angles to Fig. 1, and

Fig. 6, a detail.

In the drawings reference character 10 indicates a body of a tractor having rear wheels 11 and front wheels 12. The rear wheels are connected by differential gearing in a differential gear casing 13.

The supporting devices of my invention comprise a pair of I-beams 14 extending from the front of the tractor to a point some distance in the rear of it. It is to be understood that other forms of structural iron beams known to the trade may be used if desired. The I-beams are connected at the front by a cross-bar 15 and at the rear by a series of cross-bars 16, 17 and 18 all of these cross-bars being preferably angle irons L-shaped in cross section. At the front end of each I-beam is a hole 19 through which a chain or cable may pass for anchoring the tractor when pulling in a horizontal line back of the machine or for tandem operation or the like.

It is necessary to extend the beams out to the front of the tractor since rearward extension thereof combined with the weight of the winch causes the frame to be overbalanced. In further pursuance of this purpose I provide upon each of the I-beams a weight or a box 20 which when filled with sand or other heavy material will serve to counterbalance the weight of the parts back of the axle. The long extension of the I-beam back of the rear axle tends to prevent accidents due to overturning of the tractor under excessive strain since the I-beams will strike the ground before the machine can become overbalanced and will then prevent further tilting movement thereof.

The winch or hoisting device is supported on the tractor by means of a pair of brackets 21 on which are bearings 22 for a shaft 23. This shaft in turn supports a drum having a body 24 and braking flanges 25 and 26 surrounded by brake bands 27. The flange 26 is disk-shaped and has laterally projecting annular flanges 28 and 29, the first serving for engagement of a brake-band 27 and the second having outwardly facing teeth for engagement by a detent 30 operated by a lever 30'.

The flange 25 is also disk-shaped and has two laterally projecting annular flanges, one of which is engaged by a brakeband 27. The annular flanges of disk 25 provide opposed inclined surfaces to receive between them double conical friction blocks 31 having inclined faces corresponding to those on the flanges. These friction blocks are mounted on one face of a gear 32 meshing with a pinion 33 on a shaft 34. The pinion is integral with or secured to a sprocket gear 35 driven by a sprocket chain 36 and passing on the other side of the axle of the rear wheels over a sprocket 37 driven by the engine. The lower run of the sprocket chain is supported by an idler 38 adjustably mounted to take up slack in the loose side of the chain. The idler is mounted on a lever 38' having a spring 47' secured to one end thereof for automatically taking up slack in the chain to a certain extent, the other end of the spring being connected to a cross-bar 47. The action of the spring is augmented by adjusting means comprising a link 39 connected to the cross-bar 16 and adjustable up and down on the same.

The clutch comprising disk 25 and block 31 is actuated by a handle 40 operating a screw 40' in a fixed nut 41 whereby the drum 24 is moved lengthwise to engage the angular flange of disc 25 with the conical friction blocks 31 attached to gear 32, the teeth on pinion 33 being of sufficient length for engagement with the teeth of the gear 32 in all its positions of adjustment.

For operating the brake bands 27 I have provided a lever 42 mounted on a rotatable shaft 43 having eccentric portions 44 connected to the brake bands 27 for tightening the same on rotation in one direction and loosening them on rotation in the other.

The brackets 21 are here shown as being rigidly connected by rods 45. The fixed ends of the brake bands are secured by means of bolts 46 to the cross beam 47 fixed to the side members of the frame to which spring 47' is also secured. The I-beams are secured to the rear axles by U-bolts 48 passing about the axles and through the flanges of the I-beams. A roller 49 is loosely mounted on the rear one of the bars 45, to guide the cable while being wound on or off from the drum.

For strengthening the connection between the tractor and the demountable frame I have secured a brace 50 to the cross bar 16 at one end and at the other end to the draw bar cap 52. The load, by my method of attachment is placed near the traction wheels and over the bearing of the axle while the frame is braced to the draw bar near the rear of the tractor thereby forming a three-point bracing attachment as sturdy as the tractor itself. A detent 51 on the ratchet lever 30' is arranged to engage a shoulder on the frame for holding the detent 30 out of engagement with the teeth 29 on the flange 26 of the drum 24. The lever is operated by hand and is normally held in the position indicated in Figure 5 by means of a spring 52.

Having thus fully described my said invention, what I claim as new and desire to secure by Letters Patent is:

1. An attachment for supporting auxiliary mechanisms upon a tractor having front and rear wheels said means comprising side beams secured to the rear axle of the tractor and projecting rearwardly therefrom said beams extending approximately to the front of the tractor and weight boxes upon the beams in front of the rear axle, substantially as set forth.

2. An attachment for supporting auxiliary mechanisms upon a tractor having front and rear wheels said means comprising side beams detachably secured to the rear axle of the tractor and projecting rearwardly therefrom said beams extending freely approximately to the front of the tractor, a winch secured to said beams back of the rear axle, and weight boxes upon the beams in front of the rear axle, substantially as set forth.

3. A frame for supporting auxiliary mechanisms upon a tractor comprising side bars supported intermediate their ends on the rear axle of a tractor, said bars projecting a greater distance forward than rearward from said axle for counterbalancing the auxiliary mechanisms mounted on the frame, a cross bar connecting said side bars spaced from such rear axle rearwardly of the auxiliary mechanism, and a brace having one end connected to the draw-bar of the tractor on the differential housing and having its other end connected to said cross bar for supporting and bracing said frame, substantially as set forth.

4. An attachment for supporting auxiliary mechanisms upon a tractor comprising a frame having side bars supported intermediate their ends upon the rear axle of the tractor, said bars projecting a greater distance forward than rearward from said axle for counterbalancing the auxiliary mechanisms mounted on the frame, supports on the upper side of said side bars for bearing the weight of the auxiliary mechanisms, supports on the underside of said side bars immediately beneath the supports on the upper side thereof, a shaft mounted in said last mentioned supports and having a co-operative driving relation with the mechanisms carried on the upper supports, a cross bar connecting said side bars rearwardly of the auxiliary mechanism and a brace having one end connected to the draw bar of the differential housing and having its other end connected to said cross bar for supporting and bracing the frame, substantially as set forth.

5. An attachment for supporting auxiliary mechanisms upon a tractor comprising a frame having side bars supported intermediate their ends on the rear axle of the tractor, the portions of the arms extending forwardly of the rear axle being of a greater length than the portions extending rearwardly thereof, brackets on the side bars having portions extending above the same for supporting a portion of the auxiliary mechanism, said brackets also having portions extending beneath said side bars for supporting other parts of the auxiliary mechanism, a cross bar connecting said side bars rearwardly of the auxiliary mechanism and a brace having one end connected to the draw bar of the differential housing and having its other end connected to said cross bar for supporting and bracing the frame, substantially as set forth.

6. An attachment for tractors comprising beams secured to the rear axle and extending approximately in a horizontal plane backward from the tractor, a winch on said beams, a cross bar back of the winch, a brace extending from a point below the rear axle to said cross-bar said brace holding said beams normally out of contact with the ground, and counterbalancing means in connection with said beams in front of said rear axle coacting with said brace to support said winch, substantially as set forth.

In witness whereof, I have hereunto set my hand and seal at San Antonio, Texas, this 22nd day of April, A. D. nineteen hundred and twenty-four.

JULIUS H. HOLMGREEN. [L. S.]